Jan. 12, 1971    H. M. HAMILTON    3,553,886

CLUTCH AND DRIVE ASSEMBLY FOR MODEL VEHICLES

Filed April 3, 1968

INVENTOR
Harry M. Hamilton

BY Schmidt, Johnson, Hovey,
Williams & Bradley.
ATTORNEYS.

United States Patent Office 3,553,886
Patented Jan. 12, 1971

3,553,886
CLUTCH AND DRIVE ASSEMBLY FOR MODEL
VEHICLES
Harry M. Hamilton, 2024 Hardesty,
Kansas City, Mo. 64127
Filed Apr. 3, 1968, Ser. No. 718,632
Int. Cl. A63h 33/26
U.S. Cl. 46—210
9 Claims

ABSTRACT OF THE DISCLOSURE

A power train for model vehicles which vehicle includes a power source, there being driving means rotatably carried by the power source, clutch means shiftably carried by the vehicle for engagement with the driving means and coupling means simultaneously engageable with the clutch means whereby the wheel and axle unit of the vehicle may be driven, there being apparatus carried by the vehicle whereby the clutch means may be shifted from a position remote from the vehicle. Various combinations of clutch and coupling means give reverse drive to the vehicle and forward drive in varying ratios.

---

It is the primary object of this invention to provide, in combination with a model vehicle having a power source, such as a small gasoline engine, and at least one wheel and axle unit, a clutch and drive assembly defining a power train from the power source to the wheel and axle unit.

It is a yet further important object to provide, in said power train, a cone of frictionable material which is rotatably driven by the power source, the clutch means including a second rotatable cone which is shiftably mounted on the vehicle, the means for coupling the clutch with the wheel and axle unit including a third rotatable cone of frictionable material, said first cone and said third cone being simultaneously engageable by the clutch cone whereby to constitute a power train from the power source to the wheel and axle unit.

It is a yet further significant aim of this invention to provide, on the vehicle, apparatus coupled with the clutch means whereby the clutch cone may be shifted from a position remote from the vehicle.

Other objects of the invention include the various combinations of clutch means and coupling means as disclosed in the drawing, whereby selected driving ratios in a forward direction may be obtained and also reverse movement of the vehicle may be obtained through a suitable power train assembly.

Further details will become apparent from the following specification and accompanying drawing, wherein.

Figure 1:
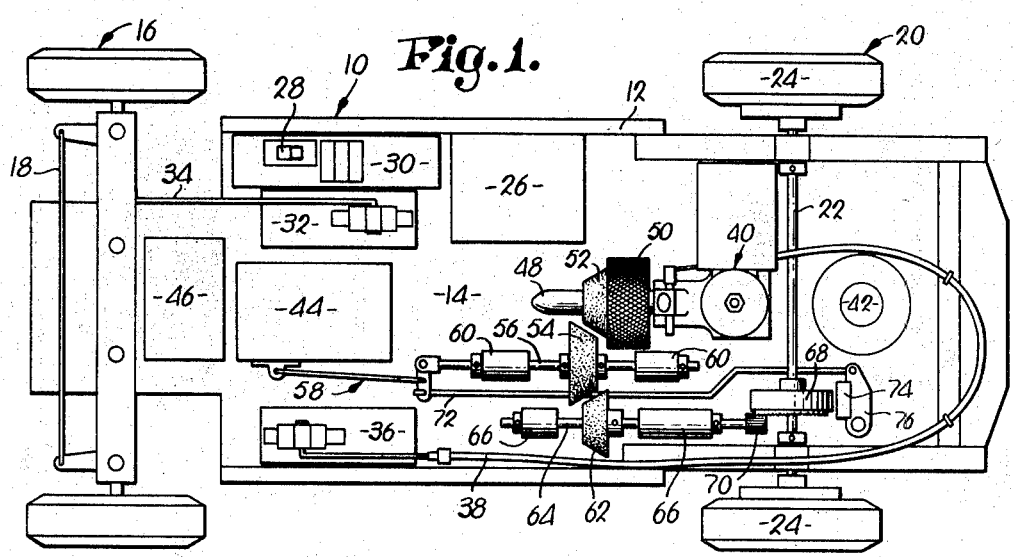
FIG. 1 is a plan view of the vehicle with the body removed and showing one form of the invention.

Referring initially to the form of the invention illustrated in FIG. 1, there is presented a model vehicle 10 having a chassis 12 which carries a baseplate 14, which plate 14 serves to support the various components hereinafter described. The vehicle is provided with a front wheel and axle assembly 16 provided with steering mechanism 18 and a rear wheel and axle unit 20, said unit 20 including an axle 22 extending transversely of the chassis 12, there being a supporting wheel 24 at each outer end of axle 22, the wheel and axle unit 20 being the driven unit.

The model vehicle of the type hereinafter described is intended to be wholly remotely controlled as by radio transmitting equipment whereby the vehicle may be operated independent of any wires, guiding tracks or the like as a result of being wholly controlled by the transmission of radio signals from a position remote from the vehicle.

To this end, vehicle 10 carries, on plate 14, a radio receiver 26 to which signals may be transmitted from a remote location to operate the vehicle and actuate the various components thereof. A master switch 28 is provided for radio receiver 26, the same being carried by a terminal block 30 also carried by plate 14.

A steering servomechanism 32 is carried by plate 14 and is coupled, as by rod 34, with the front wheel and axle assembly whereby, upon actuation of servomechanism 32, the vehicle may be steered.

A throttle servomechanism 36 is also carried by plate 14 and is suitably coupled, as by a flexible cable 38, with the power source 40 which is in the form of a small gasoline powered engine, there being a fuel tank 42 carried by the vehicle whereby fuel may be continuously supplied to the motor 40.

A further servomechanism 44 is carried by vehicle 10 immediately rearward of a battery 46, the servomechanism 44 being that which controls the clutch and drive assembly. It will be appreciated that servomechanisms 32, 36 and 44 are suitably coupled with the radio receiver and other components carried by the vehicle whereby said servomechanisms may be actuated from a position remote from the vehicle by transmitting to the receiver 26 suitable signals whereby to selectively actuate the desired servomechanism.

In the embodiment illustrated in FIG. 1, the power source 40 includes a driven motor shaft 48 having a flywheel 50, there being a first cone 52 of frictionable material affixed to said shaft 48 whereby to rotate therewith when the power source 40 is actuated. Thus, the first cone 52 constitutes driving means which is powered by the power source 40.

The clutch means includes a second rotatable cone 54 of frictionable material, which cone 54 is rotatable upon a shaft 56, said shaft 56 being coupled with servomechanism 44 as by linkage 58 whereby said shaft 56 may be shifted longitudinally of the vehicle upon actuation of servomechanism 44. To this end, shaft 56 is carried by spaced bearing blocks 60 which are supported by baseplate 14.

The means for coupling the clutch with the wheel and axle unit 20 includes a third cone 62 which is affixed to a shaft 64, said shaft being carried by bearing blocks 66 which are, in turn, supported by baseplate 14. The coupling means also includes a gear 68 fixed to axle 22, which gear is engaged by a pinion 70 carried by said shaft 64.

With the foregoing construction, and when it is desired to drive the vehicle 10 in a forward direction, th power source 40 is actuated and a suitable signal subsequently transmitted to receiver 26 whereby to actuate servomechanism 44 in such a manner as to shift linkage 58 to the right viewing FIG. 1, whereby second cone 54 will simultaneously engage the rotating first cone 52 and the third cone 62, the rotative movement of first cone 52 therefore being transmitted to second cone 54, which second cone rotates upon its shaft 56, said driving power then being transferred to third cone 62, which is affixed to shaft 64, with the resultant rotation of shaft 64 and pinion 70 to thereby drive gear 68 which is directly fixed to axle 22, the power train hereinabove described thereby causing driving of the vehicle under control from a remote position.

When it is desired to stop the vehicle, a suitable signal is transmitted to receiver 26 whereby to cause servomechanism 44 to shift linkage 58 to the left, viewing FIG. 1, thereby disengaging second cone 54 from first cone 52 and third cone 62. As the power train is so interrupted, a braking action may be imparted by further shifting of said linkage 58 to the left whereby to actuate a braking rod 72 which, in turn, swings pressure pad 74 pivotally carried by a lever 76 against the edge of gear 68 to thereby slow the rotation of gear 68 and ultimately brake axle 22.

From the foregoing it will be appreciated that the model vehicle may be entirely controlled from a remote location, the servomechanism 44 controlling the power train and braking of the vehicle; the servomechanism 32 controlling the steering of the vehicle; and servomechanism 36 being a throttle servomechanism controlling the actuation of power source 40. While the form of invention illustrated in FIG. 1 shows a single ratio forward drive model vehicle, it will be readily appreciated that the driving, clutch and coupling means may be suitably altered whereby to provide, in the model vehicle, various driving or gear ratios in a forward direction and also provide reverse drive for the vehicle.

Figure 2:
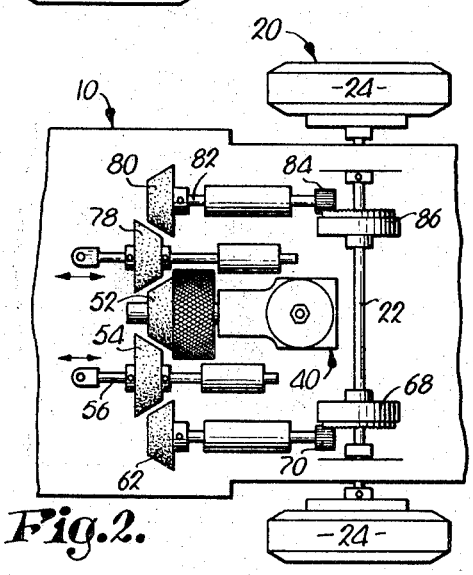
FIG. 2 is a fragmentary plan view of a portion of the vehicle showing another embodiment of the invention.

Thus, for instance, the form of invention illustrated in FIG. 2 shows a forward drive similar to that shown and described with respect to FIG. 1, said embodiment also illustrating a manner in which a reverse direction may be imparted to the vehicle. Thus, in addition to first cone 52, second cone 54, and third cone 62, there is provided a second pair of cones corresponding to cone 54 and 62 respectively, said second pair of cones being designated as 78, in the case of the clutch cone, and 80 in the case of the coupling cone, said cones 78 and 80 being disposed on the opposite side of first cone 52 from cones 54 and 62.

The clutch cone 78 is suitably coupled with servomechanism of the type hereinabove described whereby the same may be shifted, upon actuation of such servomechanism from a remote location, to simultaneously engage driving cone 52 and coupling cone 80 to thereby impart a reverse drive to the vehicle inasmuch as cone 80 is affixed to rotatable shaft 82, which shaft, at its opposite end, carries a pinion 84 which meshes with a gear 86 affixed to axle 22.

It will be apparent that the reverse power train would be operated independently of the forward drive power train but that it would not be necessary to reverse the direction of rotation of driving cone 52, since cones 78 and 80 are disposed on the opposite side thereof and thereby impart a direction of movement to the vehicle reverse to that imparted by cones 54 and 62.

Figure 3:
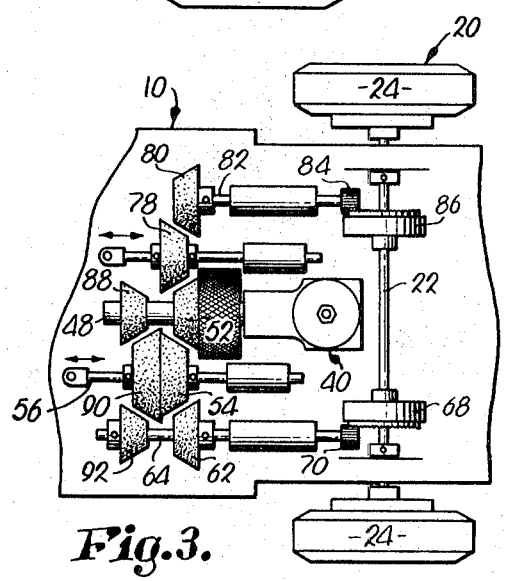
FIG. 3 is a fragmentary plan view of the vehicle showing yet another embodiment of the invention.

In the form of invention illustrated in FIG. 3 of the drawing, the vehicle 10 is shown with supplemental power train cones, in addition to those shown in FIG. 2 of the drawing, whereby two ratios of forward drive are provided for the vehicle in addition to a reverse drive.

The second ratio of forward drive is provided by a series of supplemental cones, this including a first supplemental rotatable cone 88 of frictionable material carried by the driven motor shaft 48 and rotatable therewith; the clutch means including a second supplemental, rotatable cone 90 of frictionable material which is carried upon shiftable shaft 56; and a third supplemental rotatable cone 92 of frictionable material is carried on rotatable shaft 64, which shaft 64 is coupled with axle 22 in the same manner as the form of invention shown in FIGS. 1 and 2 of the drawing.

Thus, cone 52 and supplemental cone 88 are carried by common shaft 48; cone 54 and supplemental cone 90 are carried by common shiftable shaft 56; and cone 62 and supplemental cone 92 are both affixed to rotatable shaft 64.

With the foregoing power train, a first driving ratio can be obtained by shifting shaft 56, which is suitably coupled to servomechanism of the type hereinabove described, to the right viewing FIG. 3, whereby clutch cone 54 will simultaneously engage cones 52 and 62 to thereby impart driving movement to the wheel and axle unit 20. When a different driving ratio is desired, shaft 56 is shifted, by the servomechanism, to the left viewing FIG. 3 whereby to disengage cone 54 from cones 52 and 62 and cause supplemental cone 90 to engage supplemental cone 88 and supplemental cone 92 to thereby impart a different driving ratio to the wheel and axle unit 20 inasmuch as cones 88, 90 and 92 are of a circumference different from that of cones 52, 54 and 62.

Figure 4:
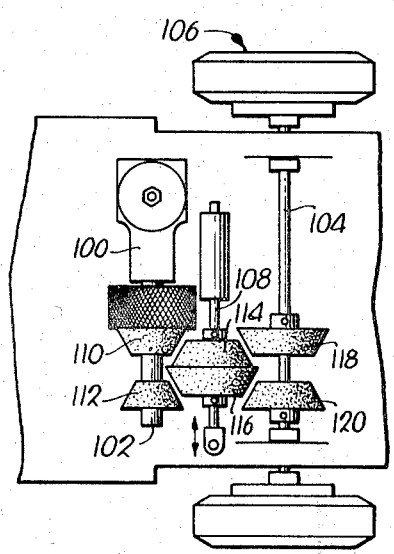
FIG. 4 is a fragmentary plan view of the vehicle showing form of the invention.

In the form of invention illustrated in FIG. 4, the power source, designated as 100 is disposed in such a position that the driven shaft 102 thereof is in parallel relationship with the axle 104 of wheel and axle unit 106. Interposed between shaft 102 and axle 104 is a shiftable shaft 108 which is in parallel relationship to shaft 102 and axle 104 and is suitably coupled to servomechanism whereby said shaft 108 may be shifted longitudinally.

A first driving cone 110 is affixed to shaft 102 and rotates therewith. A second driving cone 112 is also affixed to shaft 102, is spaced from said first cone 110 and is in opposed relationship thereto. The shiftable shaft 108 carries a first clutch cone 114 and a second clutch cone 116, both of said cones being rotatable upon shaft 108.

The clutch cones are selectively coupled to the axle 104 as by either a first coupling cone 118, or a second coupling cone 120, both of said cones 118 and 120 being affixed to axle 104. As is apparent from the foregoing, once it is desired to drive the wheel and axle assembly 106 at one ratio, the power source 100 is actuated and servomechanism remotely operated whereby to shift shaft 108 in a direction to cause clutch cone 114 to simultaneously engage driving cone 110 and coupling cone 118 to thereby provide a direct drive to the axle 104 from the power source 100.

If the second driving ratio is to be utilized, then the shaft 108 is shifted in an opposite direction to thereby cause clutch cone 116 to simultaneously engage second driving cone 112 and second coupling cone 120 thereby imparting forward movement to the vehicle in a ratio different from that achieved by the first series of cones due to the fact that said second series of cones are of a circumference different from said first series.

Figure 5:
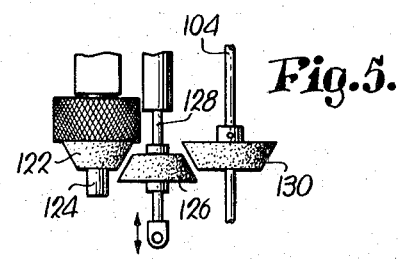
FIG. 5 is a schematic showing of another form of the invention.

FIG. 5 of the drawing illustrates a form of the invention similar to that shown in FIG. 4 with the exception that a single series of cones is provided, there being a driving cone 122 carried by the motor driven shaft 124; a clutch cone 126 carried by a shiftable shaft 128 which is suitably coupled with servomechanism; and a coupling cone 130 carried by the axle 104 of the wheel and axle unit 106.

As is obvious from the foregoing description, when it is desired to utilize the power train illustrated in FIG. 5 of the drawing, the power source 100 is actuated and the servomechanism coupled with shaft 128 likewise actuated to shift cone 126 into simultaneous engagement with cones 122 and 130 thereby directly driving axle 104.

The above described embodiments of this invention illustrate various manners in which the concepts thereof may be carried out by providing, within the concept of this invention, various forms of a clutch and drive assembly for model vehicles which may be remotely operated to thereby drive the vehicle at a predetermined speed or in a predetermined direction.

Having thus described the invention, what is claimed as new and desired to be secured by Letters Patent is:

1. In combination with a model vehicle having a power source and at least one wheel and axle unit, a power train for transmitting driving power from said source to said unit, said power train comprising:

driving means rotatably carried by said power source and adapted to be rotated in a given direction upon actuation of said source, said driving means being in the form of a first rotatable cone of frictionable material carried by a shaft driven by said power source;

clutch means shiftably carried by said vehicle and adapted to be shifted into engagement with said driving means, said clutch means including a second rotatable cone of frictionable material selectively engageable with said first cone;

means coupling said clutch means with said wheel and axle unit; and means for shifting said clutch means from a position remote from said vehicle, said shifting means including remotely actuatable servomechanism coupled with said second cone for shifting the same toward and away from said first cone.

2. The invention as set forth in claim 1, there being means for controlling the speed of rotation of said driving means from a position remote from said vehicle.

3. The invention as set forth in claim 1, said coupling means including a third rotatable cone of frictionable material which is simultaneously engaged by said second cone when the latter is shifted into engagement with said first cone, whereby rotative movement is imparted to said third cone to thereby drive said wheel and axle unit.

4. The invention as set forth in claim 3, there being braking means coupled with said servomechanism whereby the latter may be remotely actuated to apply a braking action to said wheel and axle.

5. The invention as set forth in claim 3, there being a second pair of cones corresponding to said second and third cones respectively and disposed on the opposite side of said first cone, one or said second pair of cones being shiftable and selectively engageable with said first cone, the other of said second pair of cones being coupled with said wheel and axle unit whereby when said one cone is shifted, it engages said first cone and said other cone to thereby drive said wheel and axle unit in reverse direction to that in which it is driven by shifting of said second cone.

6. The invention as set forth in claim 3, said driving means including a first supplemental, rotatable cone of frictionable material carried by the shaft driven by said power source, said clutch means including a second supplemental, rotatable cone of frictionable material and of greater circumference than said second cone, said second supplemental cone being selectively engageable with said first supplemental cone; said coupling means including a third supplemental, rotatable cone of frictionable material of lesser circumference than said third cone which is simultaneously engaged by said second supplemental cone when the latter is engaged with said first supplemental cone whereby rotative movement is imparted to said third supplemental cone to thereby drive said wheel and axle unit; and means coupling said second supplemental cone with said servomechanism whereby said second supplemental cone may be shifted toward and away from said first and third supplemental cones.

7. The invention as set forth in claim 6, said second cone and said second supplemental cone being carried by a common shaft; and said third cone and said third supplemental cone being carried by a common shaft.

8. In combination with a model vehicle having a power source and at least one wheel and axle unit, a power train for transmitting driving power from said source to said unit, said power train comprising:

a shiftable shaft carried by said vehicle in parallel, spaced relation to said axle;

a shaft driven by said power source and disposed in parallel, spaced relation to said shiftable shaft;

at least one driving cone of frictionable material carried by said driven shaft and rotatable therewith;

at least one clutch cone of frictionable material carried by said shiftable shaft, rotatable thereon and selectively engageable with said driving cone;

at least one coupling cone fixedly carried on said axle; and means for shifting said shiftable shaft from a position remote from said vehicle whereby to cause said clutch cone to simultaneously engage said driving cone and said coupling cone to thereby transmit driving power to said axle upon actuation of said power source.

9. The invention as set forth in claim 8, there being a second cone on said shiftable shaft, a second cone on said driven shaft and a second cone on said axle, said second cones being in spaced, opposed relationship to said first cones, said second cones constituting a supplemental power train of a driving ratio different from that constituted by said first cones.

References Cited
UNITED STATES PATENTS

| 2,233,967 | 3/1941 | Wellton | 74—192X |
| 3,029,371 | 4/1962 | Saito | 46—210 |
| 3,344,553 | 10/1967 | Taggart | 46—244X |

LOUIS G. MANCENE, Primary Examiner

R. F. CUTTING, Assistant Examiner

U.S. Cl. X.R.

46—206, 210; 74—192